(12) United States Patent
Davies et al.

(10) Patent No.: US 12,450,709 B2
(45) Date of Patent: Oct. 21, 2025

(54) CAMERA POSITION REVIEW FOR VEHICLE DRIVER ASSISTANCE SYSTEMS

(71) Applicant: BELRON INTERNATIONAL LIMITED, Egham (GB)

(72) Inventors: Chris Davies, Egham (GB); Gwen Daniel, Egham (GB)

(73) Assignee: Belron International Limited, Egham (GB)

( * ) Notice: Subject to any disclaimer, the term of this patent is extended or adjusted under 35 U.S.C. 154(b) by 81 days.

(21) Appl. No.: 18/685,808

(22) PCT Filed: Aug. 31, 2022

(86) PCT No.: PCT/EP2022/074188
§ 371 (c)(1),
(2) Date: Feb. 22, 2024

(87) PCT Pub. No.: WO2023/031264
PCT Pub. Date: Mar. 9, 2023

(65) Prior Publication Data
US 2024/0354922 A1 Oct. 24, 2024

(30) Foreign Application Priority Data
Sep. 1, 2021 (GB) ...................... 2112432

(51) Int. Cl.
*H04N 7/18* (2006.01)
*G06T 7/00* (2017.01)
*H04N 17/00* (2006.01)
(52) U.S. Cl.
CPC ......... *G06T 7/0002* (2013.01); *H04N 17/002* (2013.01)

(58) Field of Classification Search
CPC ....... G06T 7/0002; H04N 7/18; H04N 17/002
(Continued)

(56) References Cited

U.S. PATENT DOCUMENTS 8,379,923 B2 * 2/2013 Ishikawa ............ G01C 21/3815
382/104
8,605,947 B2 * 12/2013 Zhang ................... G08G 1/167
348/148

(Continued)

FOREIGN PATENT DOCUMENTS

WO 2011/030155 A1 3/2011

OTHER PUBLICATIONS

GB Search Report dated Feb. 24, 2022 of Application No. GB2112432.6.

(Continued)

*Primary Examiner* — Trang U Tran
(74) *Attorney, Agent, or Firm* — Gordon & Jacobson, P.C.

(57) ABSTRACT

A technique for investigating the accuracy of fitment for a vehicle replacement windscreen having a mounted driver assistance camera (DAC) utilises an illuminating radiation delivery device and a spectral reflection profile from the DAC is imaged and compared to a datum spectral reflection profile (SRP). The datum spectral reflection profile may result from a DAC fitted to the windscreen before replacement. A first spectral reflection profile may imaged with DAC in position on a damaged windscreen fitted to the vehicle and a second spectral reflection profile is imaged with DAC in position on the replacement windscreen fitted to the vehicle.

13 Claims, 6 Drawing Sheets

(58) Field of Classification Search
USPC ............................................. 348/148
See application file for complete search history.

(56) References Cited

U.S. PATENT DOCUMENTS

| | | | | |
|---|---|---|---|---|
| 9,563,951 | B2* | 2/2017 | Okouneva | G06T 7/337 |
| 9,862,332 | B2* | 1/2018 | Okuda | B60R 11/04 |
| 10,005,394 | B2* | 6/2018 | Higgins-Luthman | |
| | | | | B60Q 1/143 |
| 10,870,401 | B2* | 12/2020 | Kataishi | G03B 17/561 |
| 11,270,462 | B2* | 3/2022 | Hagenburg | H04N 23/90 |
| 11,987,185 | B2* | 5/2024 | Pawelec | H04N 23/51 |
| 2017/0278270 | A1* | 9/2017 | Singh | G06T 7/80 |
| 2017/0355408 | A1 | 12/2017 | Levy | |
| 2022/0091267 | A1* | 3/2022 | Knipl | G01S 17/931 |
| 2022/0157088 | A1* | 5/2022 | Pham | H04L 67/12 |

OTHER PUBLICATIONS

PCT Search Report and Written Opinion dated Dec. 21, 2022 of Application No. PCT/EP2022/074188.
"SmartDashCam: Automatic Live Calibration for DashCams"; Tumala, Gopi Krishna et al.; 2019 18th ACM/IEEE International Conference on Information Processing in Sensor Networks (IPSN), AMC, Apr. 15, 2019; pp. 157-168, XP03355953.

* cited by examiner

Theta angle of specularity line from vertical
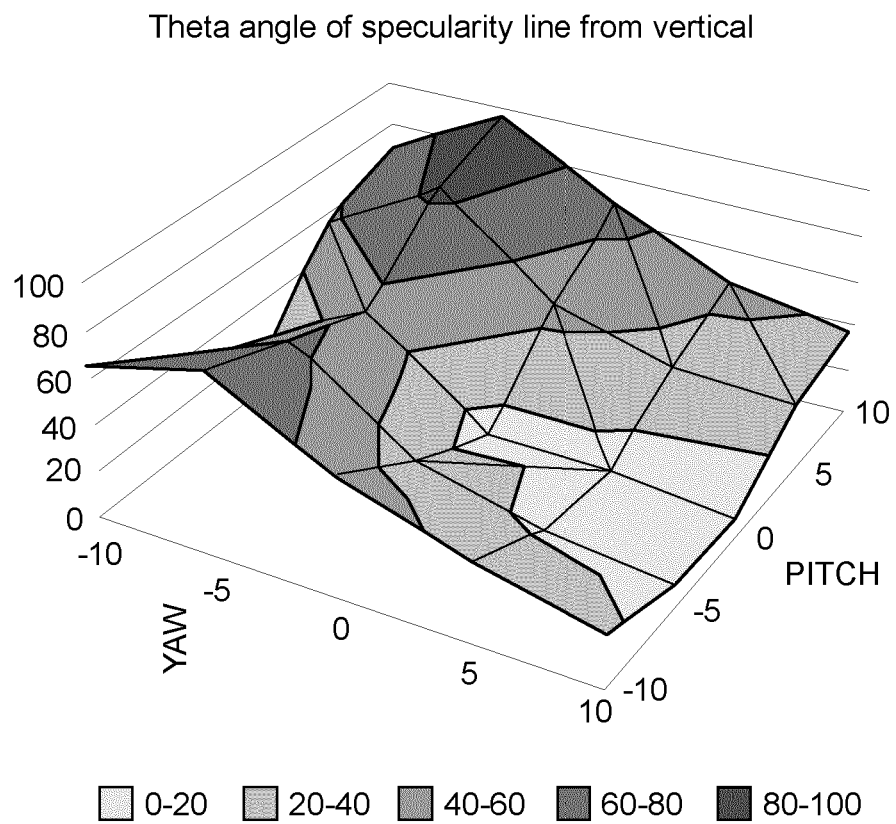
☐ 0-20   ☐ 20-40   ☐ 40-60   ■ 60-80   ■ 80-100
Figure 8
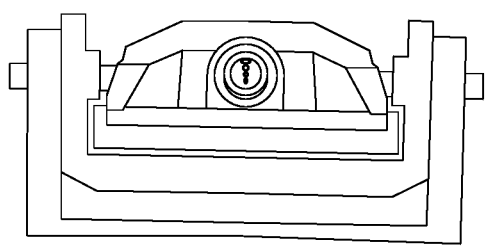
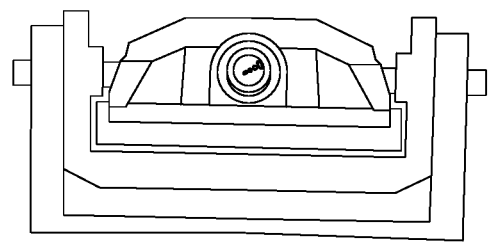
Figure 9A                    Figure 9B

|  | A | | B | |
|---|---|---|---|---|
|  | width | height | width | height |
| Measured | 1.83 | 1.4 | 4.98 | 3.47 |
| 5% | 0.0915 | 0.07 | 0.249 | 0.174 |

|  | Measured | Max | Min |
|---|---|---|---|
| width | 3.660 | 4.001 | 3.320 |
| height | 18.530 | 18.774 | 18.287 |
| length | 18.885 | 19.195 | 18.585 |
| Theta | 11.162 | 12.0294 | 10.289 |

CAMERA POSITION REVIEW FOR VEHICLE DRIVER ASSISTANCE SYSTEMS

CROSS-REFERENCE TO RELATED APPLICATIONS

This application is the national stage of International Patent Application No. PCT/EP2022/074188 filed on Aug. 31, 2022, which claims priority to GB Appl. No. 2112432.6, filed on Sep. 1, 2021, the entire contents of which are herein incorporated by reference in its entirety.

BACKGROUND

The present invention relates to camera position review/determination for vehicle driver assistance systems.

Vehicles may utilise advanced driver assistance systems (ADAS) which have components mounted to the windscreen. Forward facing cameras for ADAS systems are often windscreen mounted and provided with mounting brackets secured to the windscreen.

Typically, an Advanced Driver Assistant System (ADAS) uses a camera housed in the windscreen of modern cars to help the driver and vehicle have greater awareness of the driving conditions. They are usually positioned at the top of a windscreen looking forwards towards the road ahead. When windscreens are subjected to damage beyond repair, they are replaced. However, the ADAS (including the camera) will be transferred to the new replacement screen.

Due to the adhesive compound which secures the windscreen glazing panel to the vehicle windscreen frame, when a windscreen is replaced, it will be fitted to within a reasonably large tolerance. This can translate and rotate the camera away from its previous position. The pitch angle tolerance can vary greatly depending on the Vehicle Manufacturer—from +/−0.15 deg to +/−5 deg. If a screen is fitted and the camera is outside of the acceptable tolerance, the screen must be removed and fitted again. Based upon investigation regarding which type of movement introduces the most challenge in re-alignment, it has been identified that primarily, pitch, yaw, and roll, are the most important parameters to accurately check in a camera fitted to a replacement windscreen. The detection for X & Y translation is a trivial activity using fundamental machine vision algorithms, a combination of edge detection and circularity measurements of the ADAS camera lens.

SUMMARY

According to the invention, there is provided, in a first aspect, a method for investigating the accuracy of fitment for a vehicle replacement windscreen having a mounted driver assistance camera (DAC); wherein an illuminating radiation delivery device is used and the spectral reflection profile from the DAC is imaged and compared to a datum spectral reflection profile (SRP).

In a preferred realisation, the datum spectral reflection profile results from the or a DAC fitted to the windscreen before replacement.

In a preferred realisation:
a) a first spectral reflection profile is imaged with DAC in position on a damaged windscreen fitted to the vehicle; and,
b) a second spectral reflection profile is imaged with DAC in position on the replacement windscreen fitted to the vehicle.

It is preferred that a processor operates to compare image data relating to the datum spectral reflection profile with image data relating to the spectral reflection profile of the DAC fitted to the replacement windscreen.

The illuminating radiation is preferably delivered from a device spaced from the windscreen; and an imaging device (such as a camera) is used to capture the spectral reflection pattern.

The imaging device and the illumination delivery device may be positioned in controlled/fixed relationship to one another and to the vehicle such that accurately repeatable images can be taken with the damaged and replacement windscreens fitted to the vehicle.

The image data is preferably captured using an imaging device which is wavelength tuned to a wavelength (or wavelength band) of the illuminating radiation.

The imaged spectral reflection data is processed to identify one or more (or a combination of) roll, pitch and yaw components.

In an embodiment, the spectral reflection profile from the lens of the DAC is imaged and compared to a datum spectral reflection profile (SRP).

According to another aspect, the invention provides a method for calibration of a DAC of a vehicle diver assistance system comprising:
  i) a first step comprising investigating the accuracy of fitment for a vehicle replacement windscreen having a mounted driver assistance camera (DAC); wherein an illuminating radiation delivery device is used and the spectral reflection profile from the DAC is imaged and compared to a datum spectral reflection profile (SRP);
  ii) a subsequent step comprising calibration of the DAC.

According to another aspect, the invention provides a system for investigating the accuracy of fitment for a vehicle replacement windscreen having a mounted driver assistance camera (DAC); wherein an illuminating radiation delivery device (such as a light source) is used to direct light to impinge on the lens of the DAC and the spectral reflection profile from the DAC is imaged using an imaging device (such as a camera) and compared (for example using a processor) to a datum spectral reflection profile (SRP).

The system preferably further includes means for assuring the spatial consistency of the illuminating radiation delivery device, the windscreen, and the imaging device for imaging the DAC on the windscreen before replacement and for imaging the DAC on the windscreen following replacement.

Preferably, the system further comprises means for calibration of the DAC.

Preferred and optional features with respect to the first aspect of the invention are also envisaged as beneficial with respect to the second aspect of the invention as defined.

BRIEF DESCRIPTION OF THE DRAWINGS

The invention will now be further described, by way of example only with reference to the accompanying drawings.

FIG. 8 is a graphical representation of theta angle of specularity line from vertical;

FIG. 9A shows the specular reflection from the lens of a camera at a first yaw position;

FIG. 9B shows the specular reflection from the lens of a camera at a second yaw position;

DETAILED DESCRIPTION OF THE PREFERRED EMBODIMENTS

In the general and evolving area of this technology, a number of ADAS camera 5 variants exist, but all consistently have one (sometimes two for stereo camera systems and even three for tri-focal cameras) camera lens 6 is visible from the front of the housing camera 5 housing mounted to the windscreen. The camera 5 is housed within a bracket 4 which is connected directly to the windscreen 12, see FIGS. 1 and 3. This allows for the camera to be removed from the screen, and installed in a new windscreen bracket 4, or alternatively a new bracket 4 incorporating a camera 5 to be secured as a replacement to the windscreen 12. The exterior of the camera from the front of the vehicle is typically black and plain. From the front of the vehicle, much of the ADAS bracket and camera structure is covered by window trim and tint.

Figure 2:
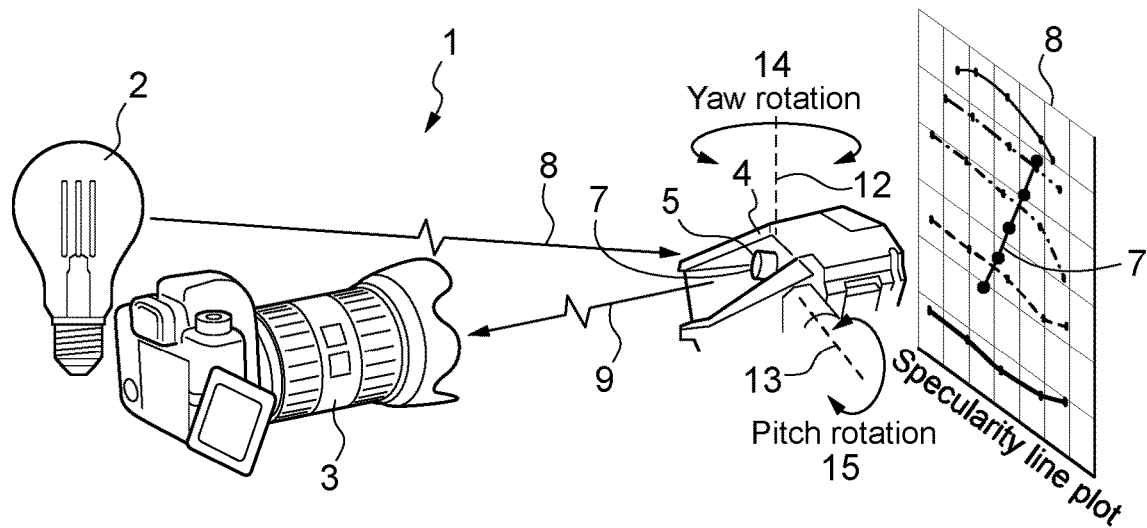
FIG. 2 shows a system set-up for use in accordance with the invention.
Figure 3:
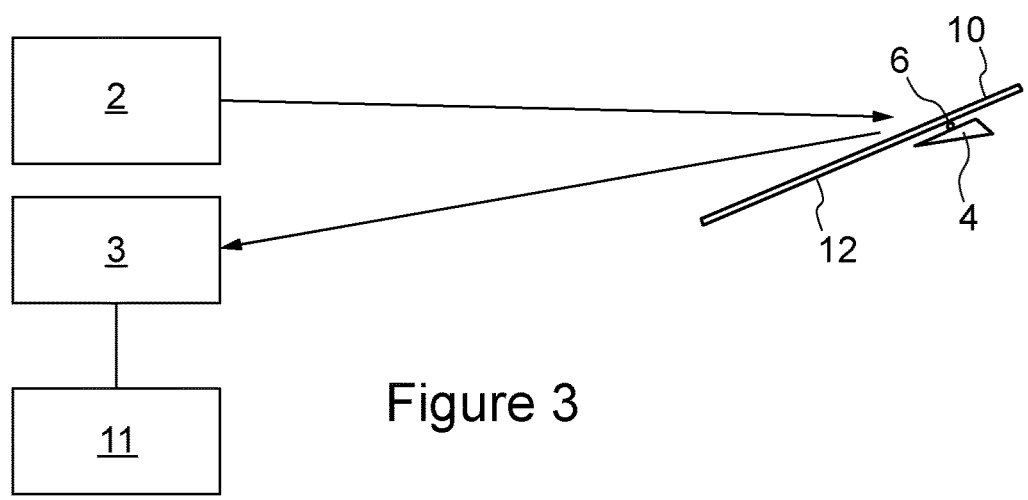
FIG. 3 is a schematic representation of the system set-up of FIG. 2.

The system and apparatus for investigating the accuracy of fitment for a vehicle replacement windscreen having a mounted driver assistance camera (DAC) is shown in FIGS. 2 and 3.

Figure 1:
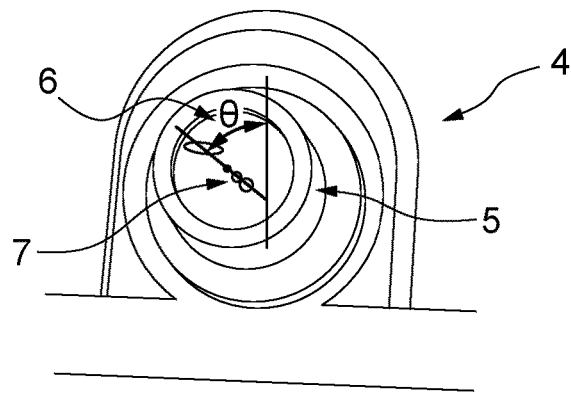
FIG. 1 shows an ADAS driver assistance camera with a spectral reflection profile.

The system operates by first being set up to image the specular reflection from the lens 6 of a DAC 5 with the windscreen to be replaced in position mounted in the vehicle before replacement. With reference to FIGS. 1 and 2, the system comprises an illuminating light source 2 positioned in a fixed location with respect to the windscreen 12 and DAC 5. An imaging device (camera 3) is also positioned in a fixed orientation with respect to the light source 2 and the windscreen 12 and DAC 5. The specular reflection from the lens 6 of the DAC 5 is then imaged and recorded electronically. When fitted to the vehicle, replacement windscreen, is then viewed with the same, replicated system set-up and the specular reflection from the DAC 5 mounted to the replacement windscreen 12 is then imaged and recorded electronically. The spectral images are compared by a processor 11, and if they are in concurrence to within a predetermined degree of tolerance or acceptability, then the system outputs that the replacement fitting of the DAC 5 mounted to the replacement windscreen 12 is acceptable. The DAC 5 may then undergo a recalibration process in accordance with known practices and techniques. In the alternative if the comparison of the before and after fitment spectral profiles in not within the accepted tolerance then a negative determination may result in the procedure being re-started. The technique gives a first indication concerning acceptable fitment of the windscreen with the mounted DAC 5 before proceeding to the standard calibration determination of the DAC 5.

The apparatus and system has a source of illuminating radiation (e.g. light) 2 which is disposed to ensure illuminating radiation is reflected from the lens 6 of the DAC 5. An imaging device (such as a camera 3) is positioned to image the specular reflection from the lens 6 wherein an illuminating radiation delivery device is used and the spectral reflection profile from the DAC 5. Before replacement of the windscreen the spectral reflection profile from the lens 6 of the camera 5 is imaged in order to provide a datum spectral reflection profile (SRP).

The illuminating radiation from the source 2 can be in the visible spectrum although wavelengths in the non-visible portion of the spectrum may be used.

Such illumination produces a noticeable spectral reflection of light source 2 in the lens 6. Not only is it noticeable that when the light source 2 changes position, but also when the lens 6 moves in relation to the static light source 2. The specular reflection is similar to the concept of lens flare. This phenomenon in the DAC is shown in FIG. 1. The reflection takes the form of several bright dots 7, which from a distance, look to follow a straight line. With closer inspection however, this line can arc or deform in certain orientations between DAC, capture camera 3 and light source 2.

In FIGS. 9A and 9B the DAC camera is shown at two different yaw positions. Inside the lens the reflection can be seen rotating around the centre clockwise from FIG. 9A to FIG. 9B. The amount of rotation is relational to the yaw rotation (reference 14 in FIG. 2). Additionally, pitch also has an influence the formation of the reflection, either with the length of the reflection line, or rotation angle. The pitch is identified by reference 15 in FIG. 2. This response determines that pitch and yaw can be inferred by the formation of the reflection in the lens, such that, after installation of the replacement windscreen carrying the DAC 5, any inaccuracy in the new position of the DAC 5 can be determined by a deviation in pitch and yaw.

The difference between the spectral reflection images of FIGS. 9A and 9B demonstrates how the reflection moves as the DAC 5 moves through pitch and yaw. The position of the light source 2 also has an impact on the spectral reflection profile. With the light source 2 close to the imaging camera 3 reference frame, the reflection is more distinct, and the dots are more in line. When the light source moves away from the reference frame, the reflection is less distinct, and the dots are less uniformly arranged.

According to the invention, the reflection of a light source 2 can be seen (and imaged by a camera 3) in the lens 6 of the DAC 5 of the ADAS system, and the form of the reflection will change in a measurable way in relation to the pitch and yaw of the DAC 5.

The following description explores the range of pitch and yaw and observes the measurable effects of the specular reflection. FIG. 2 shows how the system is arranged. The light source 2 and external camera 3 are kept at a constant position with respect to the windscreen 12 when the damaged windscreen is removed, and the replacement windscreen fitted. To test the relationship between the specular reflection that would occur from a misalignment of the DAC between the original windscreen and the fitment of the replacement windscreen, the DAC 5 of the ADAS system camera is rotated through a range of positions, −10 to +10 degrees. Both the DAC 5 and external (imaging) camera 3 are placed on the same surface and light source is close to the camera reference frame without being eclipsed by the camera. Exploration of the arrangement showed that to maximise the movement of the lens 6 reflection and achieve the most distinct dots (line 7 in FIG. 1), the light source 2 must be as close to the camera 3 reference as possible. For testing with respect to pitch and yaw the ADAS DAC 5 is mounted within an adjustable gimbal fixture that allows for controlled positioning through a range of pitch and yaw.

Using the adjustable fixture, the ADAS DAC 5 can be moved through a range of pitch and yaw angles, −10 degree to +10 degree, with 5-degree increments. At each position, an image is captured with the external camera. The lens reflection seen in each image is measured, as shown in FIGS. 5 to 8.

Figure 10:
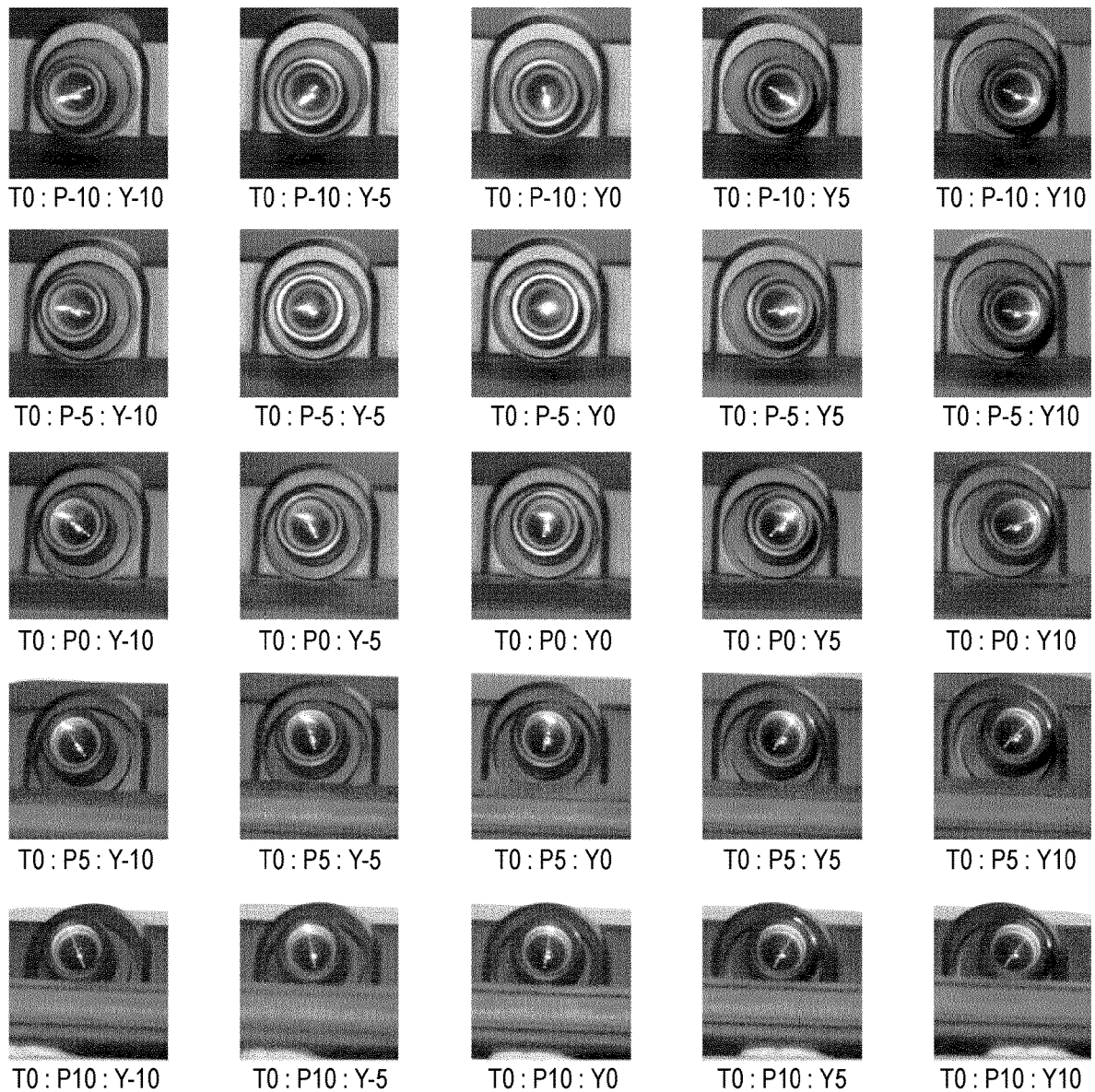
FIG. 10 presents the raw images captured at each increment of pitch and yaw. The progression of images show how the angle of the lens reflection increases/decreases with a change in pitch and yaw.

FIG. 10 presents the raw images captured at each increment of pitch and yaw. The progression of images show how the angle of the lens reflection increases/decreases with a change in pitch and yaw. It is worth noting that when the lens of the ADAS and lens of the external camera are aligned and facing each other (see FIG. 8 T0:P−5:Y−10 to T0: P−5:Y+10), the length of the reflection is shortest, and so more challenging to infer the angle. In the case of this experiment, that is most noticeable when the ADAS is at pitch−50. It is also worth noting, that when the ADAS camera goes beyond the alignment with the external camera, the direction of rotation flips, and goes in the opposite direction. This can be seen in FIG. 10 where pitch−10 the rotation is above the centre, pitch−5 is ambiguous, and 0 to 10 is below the centre.

Figure 4:
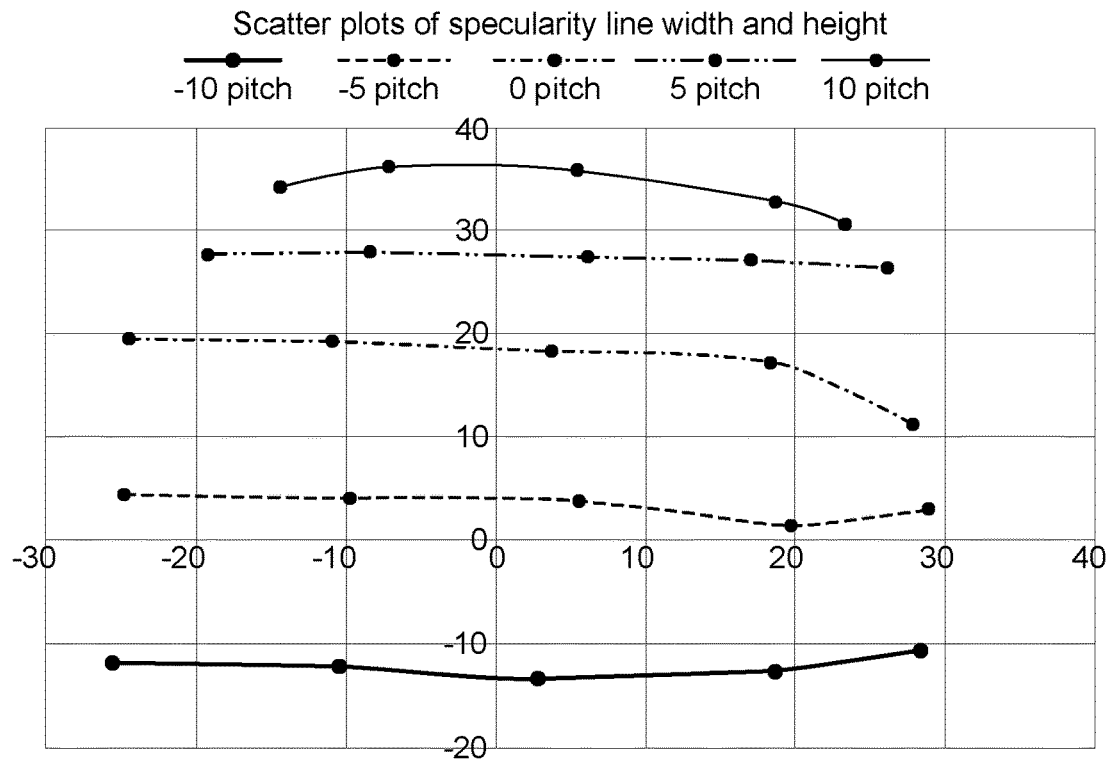
FIG. 4 is a plot showing specular line width and height.
Figure 5:
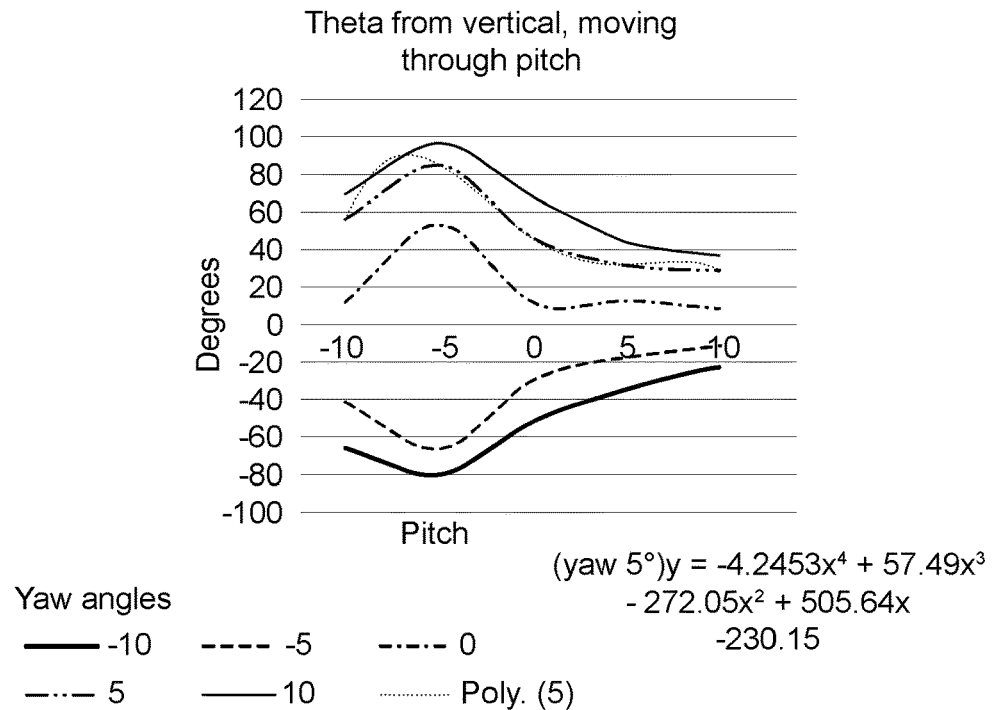
FIG. 5 is a plot showing specular line angle from vertical with pitch.
Figure 6:
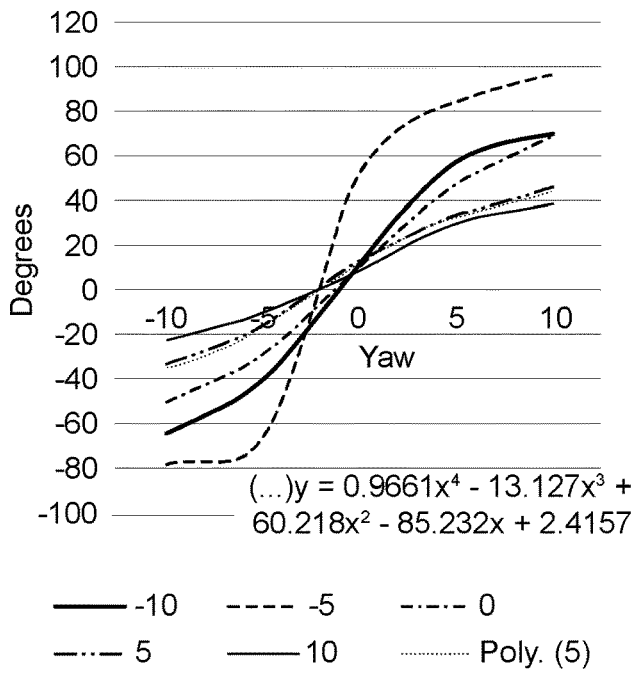
FIG. 6 is a plot showing specular line angle from vertical with yaw.
Figure 7:
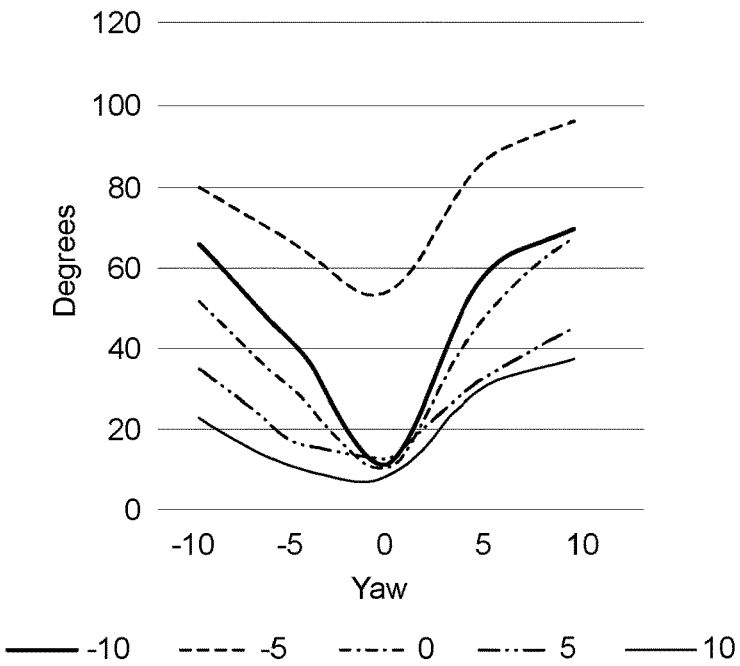
FIG. 7 is a plot showing absolute specular line angle from vertical with yaw.

With reference to FIG. 1 for explanation, in determining the angle of the specularity, the extreme dots at either end of the line 7 are captured, then their relative distances along x and y axis are measured. Pythagoras theorem can then be used to determine the angle theta based upon the opposite and adjacent dimensions. However, both these dimensions are indicative of a decoupling between pitch and yaw and their influence on the final angle theta. FIG. 4 presents a scatter plot of each combination of the opposite and adjacent (x & y) for each sample taken, where the specularity line projected back on to the plot. This data clearly shows a relationship where the opposite dimension (y) increases with pitch, and adjacent dimensions (x) increased with yaw. Whilst these relationships are not linear through their range, they are characterizable through calibration of the system, and enable decoupling of pitch from yaw by comparing the x & y measurements.

These results show that there is a relationship between the measured angle of the lens reflection and both pitch and yaw of the lens. Furthermore, the relationship can be defined mathematically. The results have shown that there are regions within the range of sensing which are less reliable, especially when both cameras are directly aligned. This determines a 'sweet spot' of alignment to avoid less sensitive regions, or regions where reflection is too poor to interpret. Exploration of the experiment arrangement also showed that light position has an effect on lens reflection range. A light source close to the DAC camera 5 reference frame produces greater range in the lens reflection, however it is not possible to have the light source directly inline without the light being blocked by the external camera.

Figures 11, 12, 13:
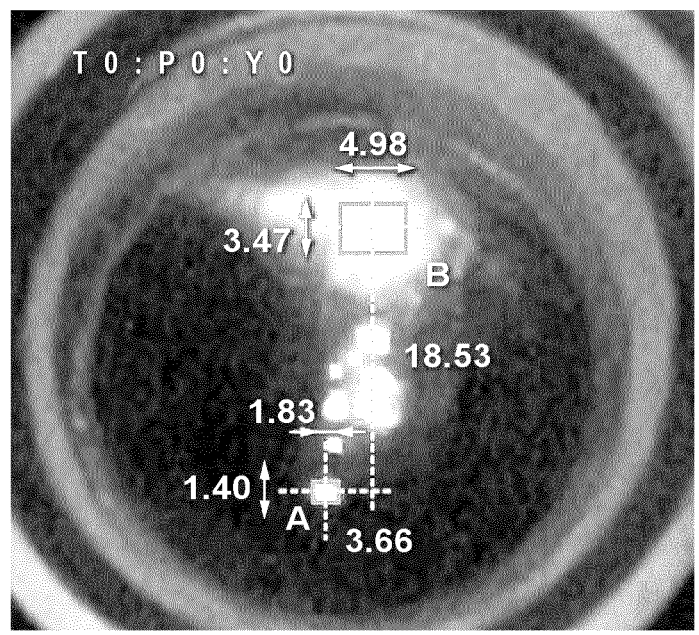
FIG. 11 shows the image from sample where the extreme specularity dots are highlighted with bounding boxes which have been identified using a machine vision thresholding process.
FIGS. 12 and 13 are tables relevant to the specularity measurement.

Determining accuracy with the configuration described is only indicative of more sophisticated camera equipment, but assumptions can be made to help arrive at an accuracy figure. FIG. 11 shows the image from sample T0:P0:Y0, where the extreme dots (A & B) are highlighted with bounding boxes which have been identified using a machine vision thresholding process. It is acknowledged that the accuracy of these bounding boxes is subjected to image noise and finely tuned thresholding parameters. With that in mind, this discussion will assume that a bounding box will have a +/−5% accuracy. Each box has been annotated with relative pixel dimensions, alongside the relative x and y distance as measured previously as part of the data analysis.

FIG. 12 presents the propagation of the assumed 5% machine vision accuracy to the bounding box measurements. FIG. 13 calculates the maximum and minimum measurements for both dots, A & B. Using these limits, it presents the maximum and minimum possible theta angles with a +/−0.87 degrees. If we relate this to the earlier discussion, and the trend line for pitch 5 degrees, it has an approximate range of +/−40 degrees range of specularity rotation for a physical yaw range of +/−10 degrees. The approximate relationship between specularity rotation and yaw, disregarding linearity is 4 degrees to 1 degree (specularity to yaw) with an accuracy of +/−0.87 degrees specularity rotation, which propagates to +/−0.22 degrees real yaw rotation.

Whilst this calculation is based upon assumptions, it does explore the effect of the vision equipment accuracy and provides opportunity to explore what measures can be taken to improve this figure. For example, a pixel measurement is proportional to the image sensor size used in the external camera. More pixels used in the captured image will provide a higher resolution for pixel measurements. Using a suitable lens will allow the image to zoom to and focus on the ADAS lens specifically. The sample images were taken with a 5568×3712 image sensor, but the ADAS lens occupies a 250×250 region. If a correct lens were employed to zoom to the limits of the sensor, the ADAS lens could occupy 3500×3500 with some space left to allow for mechanical alignment of the cameras. This would be an improvement of ×14 resolution. Optimistically the machine vision dot detection accuracy could be improved by ×14, providing a +/−0.36% tolerance. This would propagate through to a theta angle measurement accuracy of +/−0.063 degrees and real yaw accuracy of +/−0.016 degrees. These assumptions are based upon ideal conditions of camera equipment, however, demonstrate a means to achieve improved accuracy to a high tolerance.

These results suggest that ADAS camera orientation is clearly measurable using this specular reflection technique. It is worth noting that a windscreen offers additional geometric markers which can be used in addition to or in isolation to make inferences on positional change. For example, the aperture of the window tint shifts with a slight change in ADAS camera 5 pitch. Detection of the camera 5 lens circularity is a trivial machine vision task and offers a reference for x and y translation. Using such methods of following additional markers in combination with the reflection measure both X and Y linear translation and yaw and pitch rotation can be monitored.

The invention provides that the orientation and translation of a camera 5 in a newly fitted windscreen can be determined with machine vision equipment. In order to achieve validation, measurement of the pitch and yaw of the camera 5 are beneficially required alongside a measurement of x and y translation. Translation of x and y within a static camera 3 view is a process of matching the ADAS camera 5 profile in two images and measuring the distance between the two instances. Observations and measurements have been made which investigate a relationship between the form of specularities seen in the ADAS camera 5 lens 6 when there is a presence of an external light source 2, and the pitch and yaw of the ADAS camera 5 housing 4. This has been explored and rationalised with a demonstration of the specularities seen in the lens 6 of an ADAS camera 5 housed within a windscreen. It has been demonstrated that these specularities provide a consistence relationship with pitch and yaw which can be decoupled, that a preferred system depends on that to determine the orientation of a newly fitted ADAS camera system.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A method for investigating the accuracy of fitment of a driver assistance camera (DAC) mounted to a replacement vehicle windscreen, the method comprising:
    providing a light source at a fixed location and orientation with respect to the replacement vehicle windscreen;
    providing an imaging device at a fixed location and orientation with respect to both the replacement vehicle windscreen and the light source;
    emitting light from the light source and capturing light reflected from a lens of the DAC using the imaging device, such that the imaging device captures a spectral reflection profile of the DAC; and
    comparing, using a processor, the spectral reflection profile of the DAC to a datum spectral reflection profile to determine if the fitment of the DAC is acceptable.

2. The method of claim 1, wherein:
    comparing the spectral reflection profile of the DAC to the datum spectral reflection profile to determine if the fitment of the DAC is acceptable comprises determining, using the processor, whether the spectral reflection profile is in concurrence with the datum spectral reflection profile to within a predetermined degree of tolerance.

3. The method of claim 2, wherein, in response to determining that the spectral reflection profile is in concurrence with the datum spectral reflection profile to within the predetermined degree of tolerance, the method further comprises:
    outputting an indication that the fitment of the DAC to the replacement windscreen is acceptable.

4. The method of claim 3, wherein:
    after outputting the indication that the fitment of the DAC to the replacement windscreen is acceptable, the method further comprises calibrating the DAC.

5. The method of claim 1, wherein, in response to determining that the spectral reflection profile is not in concurrence with the datum spectral reflection profile to within the predetermined degree of tolerance or acceptability, the method further comprises:
    adjusting the position and/or orientation of the DAC;
    capturing the spectral reflection profile of the re-positioned DAC; and
    comparing, using the processor, the spectral reflection profile of the re-positioned DAC to the datum spectral reflection profile to determine if the fitment of the DAC is acceptable.

6. The method of claim 1, wherein:
    the datum spectral reflection profile results from the DAC fitted to the vehicle windscreen before replacement.

7. The method of claim 1, further comprising:
    capturing the datum spectral reflection profile with the DAC in position on a damaged windscreen fitted to the vehicle prior to fitting the replacement vehicle windscreen.

8. The method of claim 7, wherein capturing the datum spectral reflection profile comprises:
    providing the light source at the fixed location and orientation with respect to the damaged windscreen;
    providing the imaging device at the fixed location and orientation with respect to both the damaged windscreen and the light source; and
    emitting light from the light source and capturing light reflected from a lens of the DAC using the imaging device.

9. The method of claim 1, wherein:
    the imaging device is wavelength tuned to a wavelength or a wavelength band of the light source.

10. The method of claim 1, wherein:
    the spectral reflection profile is processed to identify roll, pitch and yaw components.

11. A system for investigating the accuracy of fitment of a driver assistance camera (DAC) mounted to a replacement vehicle windscreen, the system comprising:
    a light source;
    an imaging device; and
    a processor, wherein the light source is configured to direct light to impinge on a lens of the DAC, the imaging device is configured to capture a spectral reflection profile resulting from light reflecting from the lens of the DAC, and the processor is configured to compare the spectral reflection profile to a datum spectral reflection profile to determine if the fitment of the DAC is acceptable.

12. The system of claim 11, further comprising:
    means for assuring spatial consistency of the light source, the vehicle windscreen, and the imaging device for imaging the spectral reflection profile of the DAC before and after replacement of the vehicle windscreen.

13. The system of claim 11, further comprising:
    means for calibration of the DAC.

* * * * *